(12) United States Patent
Kowalkowski et al.

(10) Patent No.: US 9,068,495 B2
(45) Date of Patent: Jun. 30, 2015

(54) OXIDATION CATALYST/HYDROCARBON INJECTOR TESTING SYSTEM

(71) Applicant: GM Global Technology Operations LLC, Detroit, MI (US)

(72) Inventors: Janean E. Kowalkowski, Northville, MI (US); Chad E. Marlett, Plymouth, MI (US); Vincent J. Tylutki, Livonia, MI (US); Yun Xiao, Ann Arbor, MI (US); Umar Z. Khan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/025,152

(22) Filed: Sep. 12, 2013

(65) Prior Publication Data

US 2015/0068295 A1    Mar. 12, 2015

(51) Int. Cl.
  *G01M 15/10*    (2006.01)
  *F01N 11/00*    (2006.01)
(52) U.S. Cl.
  CPC .............. *F01N 11/007* (2013.01); *Y02T 10/47* (2013.01); *Y02T 10/24* (2013.01); *F01N 2550/02* (2013.01); *F01N 2610/03* (2013.01); *F01N 11/00* (2013.01); *F01N 11/002* (2013.01)
(58) Field of Classification Search
  CPC ..... Y02T 10/47; Y02T 10/24; F01N 2550/02; F01N 2610/03; F01N 11/00; F01N 11/002; F01N 11/007

USPC ........................................................ 73/114.75
See application file for complete search history.

(56) References Cited

U.S. PATENT DOCUMENTS

| 5,448,886 | A * | 9/1995 | Toyoda ........................... 60/276 |
| 6,901,742 | B1 * | 6/2005 | Lang et al. ...................... 60/277 |
| 7,536,851 | B2 * | 5/2009 | Mc Lain .......................... 60/277 |
| 7,610,750 | B2 * | 11/2009 | Viola et al. ...................... 60/286 |
| 8,065,871 | B1 * | 11/2011 | Fraser .............................. 60/295 |
| 8,384,397 | B2 * | 2/2013 | Bromberg et al. ............ 324/636 |
| 8,522,531 | B2 * | 9/2013 | Matsumoto et al. ........... 60/277 |
| 8,646,253 | B2 * | 2/2014 | Gloeckle et al. ............... 60/286 |
| 8,720,189 | B2 * | 5/2014 | Ren et al. ........................ 60/286 |
| 2004/0040282 | A1 * | 3/2004 | Zhu ................................. 60/276 |
| 2006/0201138 | A1 * | 9/2006 | Mc Lain .......................... 60/285 |
| 2008/0022658 | A1 * | 1/2008 | Viola et al. ...................... 60/286 |
| 2011/0099981 | A1 * | 5/2011 | Gloeckle et al. ............... 60/274 |
| 2011/0295491 | A1 * | 12/2011 | Kurahashi et al. ............ 701/103 |
| 2013/0306171 | A1 * | 11/2013 | Nagaoka et al. .............. 137/551 |

* cited by examiner

*Primary Examiner* — Freddie Kirkland, III
(74) *Attorney, Agent, or Firm* — Cantor Colburn LLP

(57) ABSTRACT

An oxidation catalyst (OC)/hydrocarbon injector (HCI) testing system includes a controller having a first oxygen sensor input configured and disposed to receive a first oxygen sensor value upstream of an oxidation catalyst (OC) device and a second oxygen sensor input configured to receive a second oxygen sensor value downstream of the OC device. The controller is configured and disposed to perform a first test to detect one of a faulty OC device and a faulty HCI based on a difference between the first and second oxygen sensor values.

20 Claims, 3 Drawing Sheets

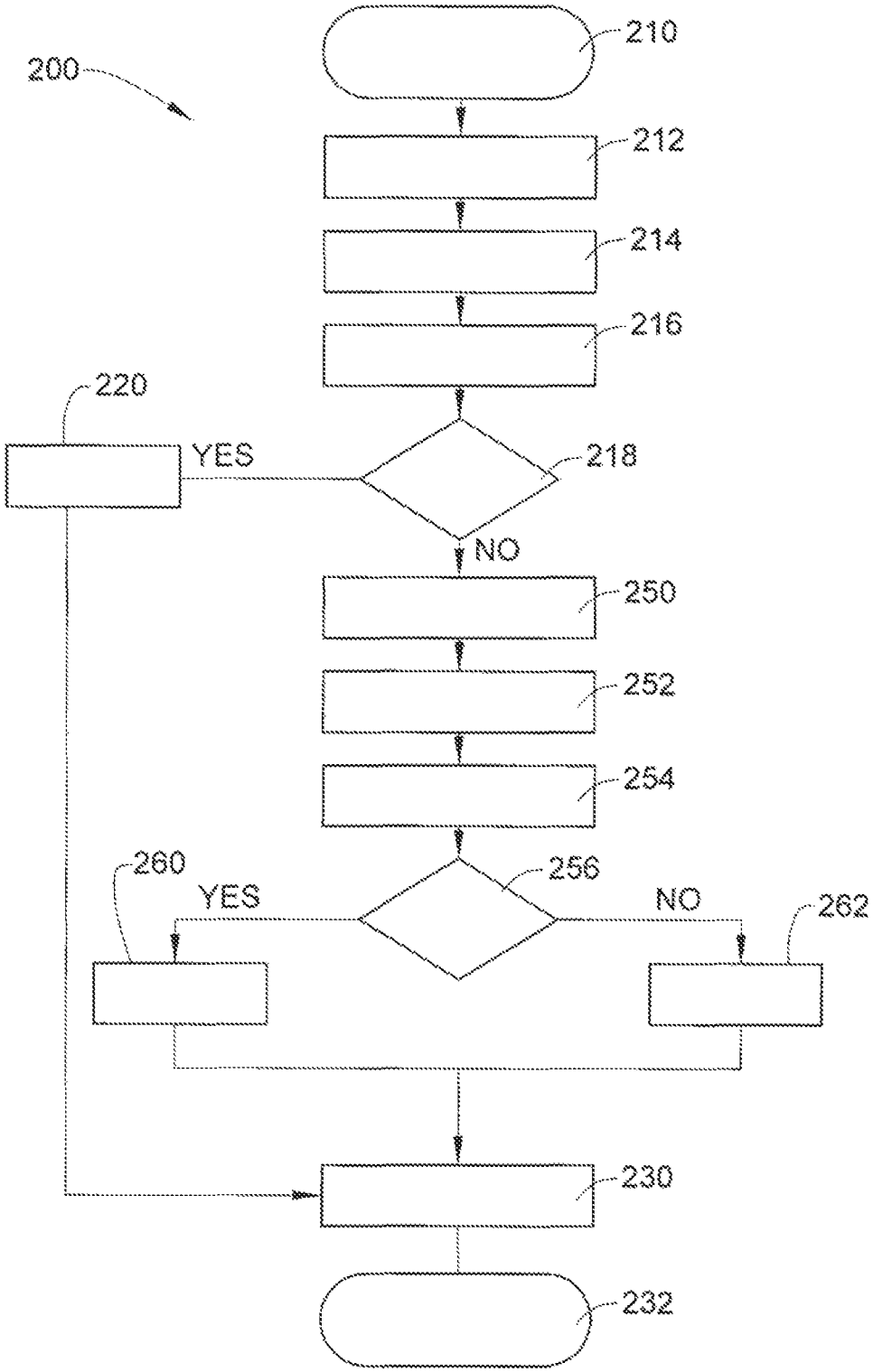

OXIDATION CATALYST/HYDROCARBON INJECTOR TESTING SYSTEM

FIELD OF THE INVENTION

The subject invention relates to motor vehicles and, more particularly, to a testing system for an oxidation catalyst (OC) and hydrocarbon injector (HCI).

BACKGROUND

Exhaust gas emitted from an internal combustion engine is a heterogeneous mixture that contains gaseous emissions such as, but not limited to, carbon monoxide ("CO"), unburned hydrocarbons ("HC") and oxides of nitrogen ("$NO_x$"), as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

One type of exhaust treatment technology for reducing emissions is a particulate filter ("PF"). The PF is designed to remove diesel particulate matter, or soot, from exhaust gas of an engine. The particulate matter removed from the exhaust gas is entrapped by, and entrained in, the PF. When accumulated soot reaches a predetermined level the PF is either replaced or regenerated. Replacement or regeneration facilitates that soot removal continues at desired parameters. In addition, many engines include an oxidation catalyst ("OC") that oxidizes hydrocarbons and carbon monoxide into carbon dioxide and water to further reduce emissions.

In certain arrangements, a motor vehicle may also include a hydrocarbon injector (HCI) that introduces hydrocarbons into exhaust gases to increase exhaust gas temperature. The increase in exhaust gas temperature heats the OC to improve catalytic performance. The introduction of hydrocarbons and added heat also reduces contaminant build up in the OC and PF. Failure of the HCI is often misdiagnosed as a failure of the OC. Replacing the OC unnecessarily is a costly and time consuming process that may lead to customer dissatisfaction. Accordingly, it is desirable to provide a testing system that can more accurately detect a faulty HCI. In addition, it is desirable to provide a testing system that can differentiate between a faulty HCI and a faulty OC.

SUMMARY OF THE INVENTION

In accordance with one exemplary embodiment, an oxidation catalyst (OC)/hydrocarbon injector (HCI) testing system includes a controller having a first oxygen sensor input configured and disposed to receive a first oxygen sensor value upstream of an oxidation catalyst (OC) device and a second oxygen sensor input configured to receive a second oxygen sensor value downstream of the OC device. The controller is configured and disposed to perform a first test to detect one of a faulty OC device and a faulty HCI based on a difference between the first and second oxygen sensor values.

In accordance with another exemplary embodiment, an exhaust system for a motor vehicle includes a hydrocarbon injector (HCI) configured to introduce hydrocarbons into the exhaust system, an oxidation catalyst (OC) device arranged downstream of the HCI, a first oxygen sensor arranged upstream of the OC device, a second oxygen sensor arranged downstream of the OC device, and an oxidation catalyst (OC)/hydrocarbon injector (HCI) testing system. The OC/HCI testing system includes a controller having a first oxygen sensor input operatively connected to the first oxygen sensor. The first oxygen sensor input is configured and disposed to receive a first oxygen sensor value. A second oxygen sensor input is operatively connected to the second oxygen sensor. The second oxygen sensor input is configured to receive a second oxygen sensor value. The controller is configured and disposed to perform a first test to detect one of a faulty OC device and a faulty HCI based on a difference between the first and second oxygen sensor values.

In accordance with yet another exemplary embodiment, a method of monitoring an oxidation catalyst (OC) device and a hydrocarbon injector (HCI) in an exhaust system includes, sensing a first oxygen sensor value at a first oxygen sensor arranged upstream of the OC device, sensing a second oxygen sensor value at a second oxygen sensor arranged downstream of the OC device, calculating a difference between the first oxygen sensor value with the second oxygen sensor value, and performing a first test to determine whether one of the OC device and the HCI is faulty based on the difference between the first oxygen sensor value and the second oxygen sensor value.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a flow diagram illustrating a method of monitoring an OC device and an HCI, in accordance with an exemplary embodiment.

DESCRIPTION OF THE EMBODIMENTS

Figure 1:
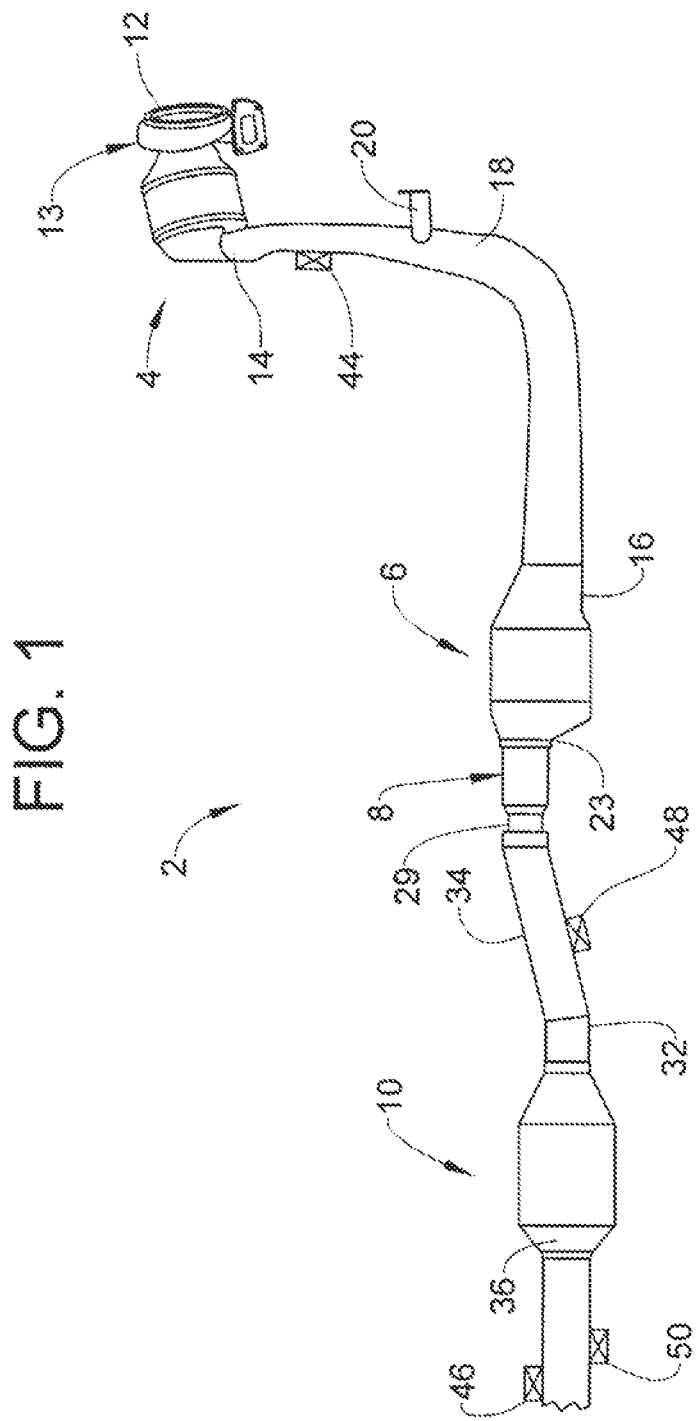
FIG. 1 is a perspective view of a portion of an exhaust system for a motor vehicle including an oxidation catalyst (OC)/hydrocarbon injector (HCI) testing system, in accordance with an exemplary embodiment.

The following description is merely exemplary in nature and is not intended to limit the present disclosure, its application or uses. It should be understood that throughout the drawings, corresponding reference numerals indicate like or corresponding parts and features. An exhaust system, in accordance with an exemplary embodiment, is illustrated generally at 2, in FIG. 1. Exhaust system 2 is provided with a plurality of emission reduction devices including a metal oxidation catalyst (MOC) device 4 fluidically connected to a selective catalytic reduction (SCR) device 6, a hydrocarbon injector (HCI) 8 and an oxidation catalyst (OC) device 10. More specifically, MOC device 4 includes an inlet 12 that may be connected to an exhaust manifold of a motor vehicle (not shown) through a turbocharger 13. MOC device 4 also includes an outlet 14 that is fluidically connected to an inlet 16 of SCR device 6 through a first exhaust pipe 18. A urea injector 20 may be arranged between MOC device 4 and SCR device 6. SCR device 6 includes an outlet 23 fluidically connected to HCI 8. HCI 8 includes an outlet 29 that may be fluidically connected to an inlet 32 of OC device 10 through a second exhaust pipe 34. OC device 10 includes an outlet 36 that leads to ambient. Outlet 36 may lead to ambient through a particulate filter (not shown).

Exhaust system 2 also includes a first oxygen sensor 44 arranged upstream of HCI 8 and a second oxygen sensor 46 arranged downstream of HCI 8. In the exemplary embodiment shown, first oxygen sensor 44 is arranged upstream of SCR device 6 and second oxygen sensor 46 is arranged downstream of OC device 10. Exhaust system 2 also includes a first temperature sensor 48 arranged upstream of OC device 10 and a second temperature sensor 50 arranged downstream of OC device 10. First temperature sensor 48 is also arranged downstream of HCI 8 in the exemplary embodiment shown. At this point it should be understood that the particular location of first and second oxygen sensors 44 and 46 and first and second temperature sensors 48 and 50 may vary. Also, it should be understood that the number of oxygen sensors and temperature sensors may vary.

Over time, and through continued use, HCI 8 and/or OC device 10 may begin to fail. In the case of HCI 8, internal parts begin to wear or clog leading to a reduction in function. OC device 10 may experience washcoat deterioration that results in a reduction in operational efficacy. Often times, a faulty HCI 8 may be misdiagnosed as a failing OC device. In accordance with an exemplary embodiment, exhaust system 2 includes an oxidation catalyst/hydrocarbon injector (OC/HCI) testing system 80, FIG. 2. OC/HCI testing system 80 includes a controller 84 which, as will be detailed more fully below, performs a number of tests that differentiate between failing OC devices and failing HCIs 8. Controller 84 may be part of motor vehicle controls (not shown) or embodied in a separate handheld device (also not shown).

Figure 2:
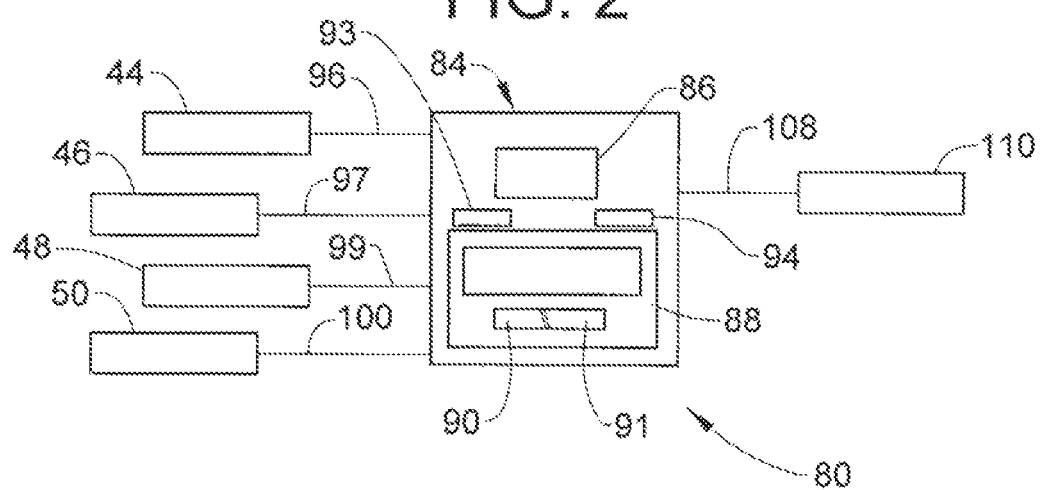
FIG. 2 is a block diagram illustrating the testing system of FIG. 1.

As shown in FIG. 2, OC/HCI testing system 80 includes a controller 84 having a central processing unit (CPU) 86 and a memory 88. As will be discussed more fully below, memory 88 stores a first threshold value 90 and a second threshold value 91. The particular value of first and second threshold values 90 and 91 may vary depending upon manufacture and model type of OC device 10. Controller 84 also includes a first filter 93 and a second filter 94. First filter 93 is used to adjust for reaction time of first and second oxygen sensors 44 and 46. More specifically, first oxygen sensor 44 may respond more quickly than second oxygen sensor 46 to changes in oxygen content in exhaust gases flowing through exhaust system 2. First filter 93 facilitates a more accurate mathematical comparison of data from each oxygen sensor 44, 46. Second filter 94 is employed by controller 84 to account for distance between first and second oxygen sensors 44 and 46.

Controller 84 is further shown to include a first oxygen sensor input 96 operatively connected to first oxygen sensor 44 and a second oxygen sensor input 97 operatively connected to second oxygen sensor 46. Controller 84 also includes a first temperature sensor input 99 operatively connected to first temperature sensor 48 and a second temperature sensor input 100 operatively connected to second temperature sensor 50. Controller 84 still further includes an output 108 that is operatively coupled to a display 110. Display 110 may represent a light on a motor vehicle instrument panel, or a graphical user interface (not shown).

Reference will now be made to FIG. 3 in describing a method 200 of testing OC device 10 and HCI 8. OC/HCI testing system 80 is initialized in block 210. Controller 84 receives a first exhaust temperature value from first temperature sensor 48 in block 212 and a second exhaust temperature value from second temperature sensor 50 in block 214. First exhaust temperature value is subtracted from second exhaust temperature value to determine a temperature differential value in block 216. Controller 84 performs a first test comparing the temperature differential values to the first threshold value 90 in block 218. If the temperature differential value is greater than first threshold value 90, both OC device 10 and HCI 8 are considered to have passed the first test and are deemed to be functioning properly in block 220. A positive test result is passed to display 110 in block 230 and testing stops in block 232. If the temperature differential value is less than first threshold value 90, controller 84 preforms a second test.

Controller 84 receives a first oxygen level input from first oxygen sensor 44 in block 250 and a second oxygen level input from second oxygen sensor 46 in block 252. Controller 84 passes the first and second oxygen levels through first and second filters 93 and 94 and then the second oxygen level is subtracted from the first oxygen level to determine an oxygen level differential in block 254. Controller 84 performs the second test in block 256 comparing the oxygen level differential to second threshold value 91. If the oxygen level differential is greater than second threshold value 91, OC device 10 is deemed faulty, and HCI 8 is deemed to be functioning properly in block 260. An output is passed to display 110 in block 230 indicating a faulty OC device 10. Conversely, if the oxygen level differential is less than second threshold value 91, HCI 8 is deemed to be faulty and OC device 10 is deemed to be functioning properly in block 262. An output is sent to display 110 indicating a faulty HCI 8 in block 230.

At this point it should be understood that the testing system described in accordance with an exemplary embodiment, determines whether both the OC device and HCI are functioning properly and, if not, differentiates between a faulty OC device and a faulty HCI based on data provided by on-board oxygen sensors. It should also be understood that the exemplary embodiments may be employed in both gasoline based and diesel based engine systems. Further, it should be understood that the present invention utilizes existing sensors to test the OC device and the HCI and thus does not require the use of additional sensors. It should also be understood that the first and second temperature values and the first and second oxygen level values may be embodied in a plurality of values received from corresponding ones of the first and second temperature sensors and the first and second oxygen sensors.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An oxidation catalyst (OC)/hydrocarbon injector (HCI) testing system comprising:
   a controller including a first oxygen sensor input configured and disposed to receive a first oxygen sensor value upstream of an oxidation catalyst (OC) device and a second oxygen sensor input configured to receive a second oxygen sensor value downstream of the OC device, wherein the controller is configured and disposed to perform a first test to detect one of a faulty OC device and a faulty HCI based on a difference between the first and second oxygen sensor values.

2. The OC/HCI testing system according to claim 1, wherein the controller further includes a first temperature sensor input configured and disposed to receive a first exhaust temperature upstream of the OC device and a second temperature sensor input configured and disposed to receive a second exhaust temperature downstream of the OC device, the controller being configured and disposed to perform a second test to detect whether the OC device and the HCI are operating within desired parameters based on a difference between the first and second exhaust temperatures.

3. The OC/HCI testing system according to claim 2, wherein the controller is configured and disposed to perform the second test before performing the first test.

4. The OC/HCI testing system according to claim 1, wherein the controller includes a first filter configured and disposed to filter the first and second oxygen values to account for reaction time of a first oxygen sensor.

5. The OC/HCI testing system according to claim 4, wherein the controller includes a second filter configured and disposed to filter the first and second oxygen values to account for distance between first and second oxygen sensors.

6. The OC/HCI testing system according to claim 1, wherein the controller is configured and disposed to compare the difference between the first and second oxygen sensor values with a threshold value to detect the one of a faulty OC device and a faulty HCI.

7. An exhaust system for a motor vehicle comprising:
a hydrocarbon injector (HCI) configured to introduce hydrocarbons into the exhaust system;
an oxidation catalyst (OC) device arranged downstream of the HCI;
a first oxygen sensor arranged upstream of the OC device;
a second oxygen sensor arranged downstream of the OC device; and
an oxidation catalyst (OC)/hydrocarbon injector (HCI) testing system comprising:
a controller including a first oxygen sensor input operatively connected to the first oxygen sensor, the first oxygen sensor input being configured and disposed to receive a first oxygen sensor value and a second oxygen sensor input operatively connected to the second oxygen sensor, the second oxygen sensor input being configured to receive a second oxygen sensor value, wherein the controller is configured and disposed to perform a first test to detect one of a faulty OC device and a faulty HCI based on a difference between the first and second oxygen sensor values.

8. The exhaust system according to claim 7, further comprising: a first temperature sensor arranged upstream of the OC device and a second temperature sensor arranged downstream of the OC device.

9. The exhaust system according to claim 7, wherein the controller further includes a first temperature sensor input operatively connected to the first temperature sensor, the first temperature sensor input being configured and disposed to receive a first exhaust temperature, and a second temperature sensor input operatively connected to the second temperature sensor, the second temperature sensor input being configured and disposed to receive a second exhaust temperature downstream of the OC device, the controller being configured and disposed to perform a second test to detect whether the OC device and the HCI are operating within desired parameters based on a difference between the first and second exhaust temperatures.

10. The exhaust system according to claim 9, wherein the controller is configured and disposed to perform the second test before performing the first test.

11. The exhaust system according to claim 8, wherein the first temperature sensor is arranged downstream of the HCI.

12. The exhaust system according to claim 7, wherein the controller includes a first filter configured and disposed to filter the first and second oxygen values to account for reaction speed of a first oxygen sensor.

13. The exhaust system according to claim 12, wherein the controller includes a second filter configured and disposed to filter the first and second oxygen values to account for a spacing between first and second oxygen sensors.

14. The exhaust system according to claim 7, wherein the first oxygen sensor is arranged upstream of the HCI.

15. The exhaust system according to claim 7, wherein the controller is configured and disposed to compare the difference between the first and second oxygen sensor values with a threshold value to detect the one of a faulty OC device and a faulty HCI.

16. A method of monitoring an oxidation catalyst (OC) device and a hydrocarbon injector (HCI) in an exhaust system, the method comprising:
sensing a first oxygen sensor value at a first oxygen sensor arranged upstream of the OC device;
sensing a second oxygen sensor value at a second oxygen sensor arranged downstream of the OC device;
calculating a difference between the first oxygen sensor value and the second oxygen sensor value; and
performing a first test to determine whether one of the OC device and the HCI is faulty based on the difference between the first oxygen sensor value and the second oxygen sensor value.

17. The method of claim 16, further comprising:
sensing a first temperature at a first temperature sensor upstream of the OC device;
sensing a second temperature at a second temperature sensor downstream of the OC device;
calculating a difference between the first temperature and the second temperature; and
performing a second test to determine whether both the OC device and the HCI are functioning properly based on the difference between the first and second temperatures.

18. The method of claim 17, wherein the second test is performed prior to the first test.

19. The method of claim 17, further comprising:
passing the first and second oxygen values through a first filter to adjust for reaction speed of the first oxygen sensor; and
passing the first and second oxygen values through a second filter to adjust for spacing between the first and second oxygen sensors.

20. The method of claim 17, wherein performing the first test includes comparing the difference between the first and second oxygen values with a threshold value to determine whether one of the OC device and the HCI is faulty.

* * * * *